(12) United States Patent
Kawaharazuka et al.

(10) Patent No.: US 12,248,286 B2
(45) Date of Patent: Mar. 11, 2025

(54) INFERRING DEVICE, TRAINING DEVICE, INFERRING METHOD, AND TRAINING METHOD

(71) Applicant: Preferred Networks, Inc., Tokyo-to (JP)

(72) Inventors: Kento Kawaharazuka, Tokyo-to (JP); Toru Ogawa, Tokyo-to (JP)

(73) Assignee: Preferred Networks, Inc., Tokyo-to (JP)

( * ) Notice: Subject to any disclaimer, the term of this patent is extended or adjusted under 35 U.S.C. 154(b) by 685 days.

(21) Appl. No.: 17/345,913

(22) Filed: Jun. 11, 2021

(65) Prior Publication Data

US 2021/0302926 A1 Sep. 30, 2021

Related U.S. Application Data

(63) Continuation of application No. PCT/JP2019/045331, filed on Nov. 19, 2019.

(30) Foreign Application Priority Data

Dec. 12, 2018 (JP) .................................. 2018-232760

(51) Int. Cl.
*G05B 13/04* (2006.01)
*B25J 9/16* (2006.01)
(Continued)

(52) U.S. Cl.
CPC ............ *G05B 13/048* (2013.01); *B25J 9/161* (2013.01); *G05B 13/047* (2013.01); *G06N 3/084* (2013.01); *G06N 5/04* (2013.01); *G06N 20/00* (2019.01)

(58) Field of Classification Search
CPC .. G05B 13/048; G05B 13/047; G05B 13/027; G05B 19/41885; G05B 2219/32343;
(Continued)

(56) References Cited

U.S. PATENT DOCUMENTS 10,300,600 B2 5/2019 Yamaoka et al.
10,603,797 B2 3/2020 Ozaki et al.
(Continued)

FOREIGN PATENT DOCUMENTS

JP 2018-030185 A 3/2018
JP 2018-118353 A 8/2018
WO WO-2018/096902 A1 5/2018

OTHER PUBLICATIONS

Hecht-Nielsen, "Theory of the backpropagation neural network," International 1989 Joint Conference on Neural Networks, Washington, DC, USA, 1989, pp. 593-605 vol. 1, doi: 10.1109/IJCNN. 1989.118638. (Year: 1989).*

(Continued)

*Primary Examiner* — Thomas C Lee
*Assistant Examiner* — Tyler Dean Hedrick
(74) *Attorney, Agent, or Firm* — Foley & Lardner LLP (57) ABSTRACT

To infer dynamic control information on a controlled object. An inferring device includes one or more memories and one or more processors. The one or more processors are configured to: input at least data about a state of a controlled object and time-series control information for controlling the controlled object, into a network trained by machine learning; acquire predicted data about a future state of the controlled object controlled based on the time-series control information via the network into which the data about the state of the controlled object and the time-series control information have been input; and output new time-series control information for controlling the controlled object to bring the future state of the controlled object into a target state based on the predicted data acquired via the network.

27 Claims, 7 Drawing Sheets

(51) Int. Cl.
*G06N 3/084* (2023.01)
*G06N 5/04* (2023.01)
*G06N 20/00* (2019.01)

(58) Field of Classification Search
CPC ... B25J 9/161; B25J 13/00; B25J 13/08; B25J 9/163; B25J 9/1633; G06N 3/084; G06N 5/04; G06N 20/00; G06N 3/045; Y02P 90/02
See application file for complete search history.

(56) References Cited

U.S. PATENT DOCUMENTS

| | | | |
|---|---|---|---|
| 2014/0309836 A1* | 10/2014 | Ollis | B60W 30/00 701/25 |
| 2015/0227676 A1* | 8/2015 | Robles | G06F 30/398 716/54 |
| 2018/0056520 A1 | 3/2018 | Ozaki et al. | |
| 2018/0207797 A1 | 7/2018 | Yamaoka et al. | |
| 2018/0354126 A1* | 12/2018 | Ueda | B25J 9/163 |
| 2019/0228587 A1* | 7/2019 | Mordvintsev | G06T 19/20 |
| 2020/0016742 A1 | 1/2020 | Ishikawa et al. | |
| 2020/0292102 A1* | 9/2020 | Ducceschi | B23K 33/006 |
| 2020/0373726 A1* | 11/2020 | Wetzel | G02F 1/35 |
| 2021/0107142 A1* | 4/2021 | Solowjow | B25J 9/163 |
| 2021/0247744 A1* | 8/2021 | Fahrenkopf | G06N 7/01 |

OTHER PUBLICATIONS

Alex X. Lee et al., "Learning Force-Based Manipulation of Deformable Objects from Multiple Demonstrations", 2015 IEEE International Conference on Robotics and Automation (ICRA), 2015 177-184.
Arunkumar Byravan et al., "SE3-Pose-Nets: Structured Deep Dynamics Models for Visuomotor Control", 2018 IEEE International Conference on Robotics and Automation (ICRA), 2018, 3339-3346.
Arunkumar Byravan et al., "SE3-Pose-Nets: Structured Deep Dynamics Models for Visuomotor Planning and Control", arXiv: 1710.00489 v1 [cs.RO] Oct. 2, 2017.
Christof Elbrechter et al., "Folding Paper with Anthropomorphic Robot Hands using Real-Time Physics-Based Modeling", 2012 12th IEEE-RAS International Conference on Humanoid Robots, 2012, 210-215.
Daisuke Tanaka et al., "EMD Net: An Encode-Manipulate-Decode Network for Cloth Manipulation", IEEE Robotics and Automation Letters, vol. 3, No. 3, 2018, 1771-1778.
Gunilla Borgefors, "Hierarchical Chamfer Matching: A Parametric Edge Matching Algorithm", IEEE Transactions on Pattern Analysis and Machine Intelligence, vol. 10, No. 6, 1988, 849-865.
Johannes Englsberger et al., "Overview of the torque-controlled humanoid robot TORO", 2014 14th IEEE-RAS International Conference on Humanoid Robots (Humanoids), 2014, 916-923.
Mitul Saha et al., "Manipulation Planning for Deformable Linear Objects", IEEE Transactions on Robotics, vol. 23, No. 6, 2007, 1141-1150.
P. Jimenez, "Survey on model-based manipulation planning of deformable objects", Robotics and Computer-Integrated Manufacturing, vol. 28, No. 2, 2012, 154-163.
Pin-Chu Yang et al., "Repeatable Folding Task by Humanoid Robot Worker Using Deep Learning", IEEE Robotics and Automation Letters, vol. 2, No. 2, 2017, 397-403.
T. M. Caldwell et al., "Optimal Parameter Identification for Discrete Mechanical Systems with Application to Flexible Object Manipulation", 2014 IEEE/RSJ International Conference on Intelligent Robots and Systems, 2014, 898-905.
Yuji Yamakawa et al., "Motion Planning for Dynamic Folding of a Cloth with Two High-speed Robot Hands and Two High-speed Sliders", 2011 IEEE International Conference on Robotics and Automation, 2011, 5486-5491.
Yuji Yamakawa et al., "Motion Planning for Dynamic Knotting of a Flexible Rope with a High-speed Robot Arm", 2010 IEEE/RSJ International Conference on Intelligent Robots and Systems, 2010, 49-54.
Zhe Hu et al., "Three-Dimensional Deformable Object Manipulation Using Fast Online Gaussian Process Regression", IEEE Robotics and Automation Letters, vol. 3, No. 2, 2018, 979-986.

* cited by examiner

FIG. 9

INFERRING DEVICE, TRAINING DEVICE, INFERRING METHOD, AND TRAINING METHOD

CROSS REFERENCE TO RELATED APPLICATIONS

This application is continuation application of International Application No. JP 2019/045331, filed on Nov. 19, 2019, which claims priority to Japanese Patent Application No. 2018-232760, filed on Dec. 12, 2018, the entire contents of which incorporated herein by reference.

FIELD

The embodiment relates to an inferring device, a training device, an inferring method, and a training method.

BACKGROUND

Conventionally, active researches are carried out for object manipulation. Among them, the flexible object manipulation is one of difficult problems in robot manipulation. In the prior researches, the object state and the geometrical relation are inferred, and the next motion is decided to establish a desired geometrical relation from the current geometrical relation. The methods of constructing modeling using machine learning for the motions are variously researched. However, especially about the manipulation of the flexible object, it has been difficult to train and infer the model by the conventional methods.

DETAILED DESCRIPTION

According to an embodiment, an inferring device includes one or more memories and one or more processors. The one or more processors are configured to: input at least data about a state of a controlled object and time-series control information for controlling the controlled object, into a network trained by machine learning; acquire predicted data about a future state of the controlled object controlled based on the time-series control information via the network into which the data about the state of the controlled object and the time-series control information have been input; and output new time-series control information for controlling the controlled object to bring the future state of the controlled object into a target state based on the predicted data acquired via the network.

The embodiment is explained below in detail referring to the drawings.

Figure 1:
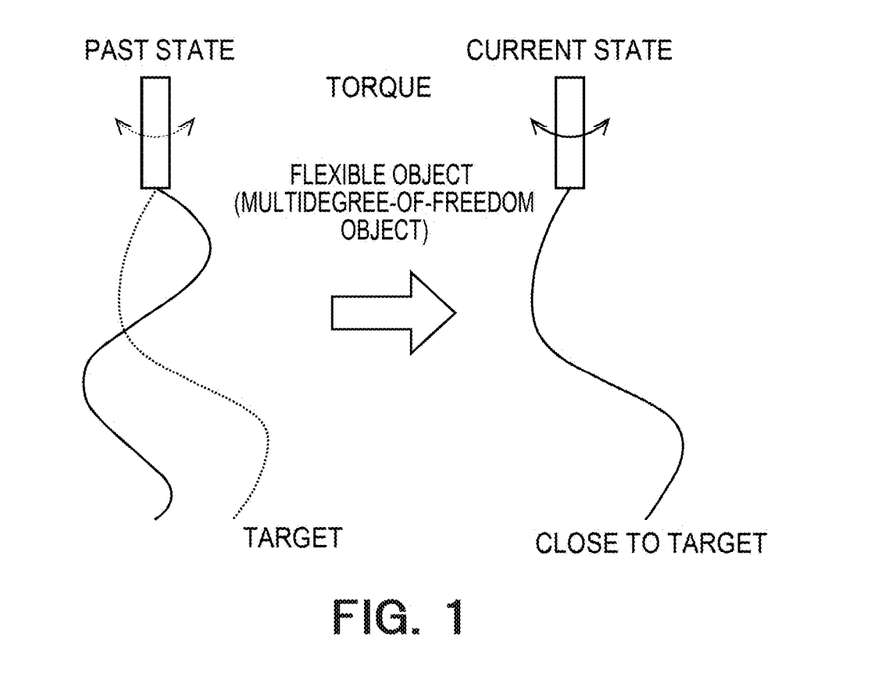
FIG. 1 is a view illustrating a state of a device according to the embodiment.

FIG. 1 is a diagram conceptually illustrating the whole picture according to the embodiment. An inferring device according to the embodiment predicts what torque should be applied at an arbitrary predetermined position of an object in order to make an object (controlled object), especially, a multidegree-of-freedom object (object having flexibility) into a desired shape. FIG. 1 is a view illustrating an example in which when what torque is applied to a flexible object with one end fixed to a control device which applies torque, the flexible object becomes a state close to a target. By inputting the state of the object in the past and the state of the target in a state at a certain point in time in the past and information on the torque to the inferring device, the shape of the object becomes close to the target in the current state.

Note that the object being the controlled object to which torque is to be applied is the multidegree-of-freedom object in the embodiment, which means an object having a plurality of joints. The number of joints only needs to be one or more. Note that the flexible object such as string or cloth can be regarded as a multijoint object (namely, a multidegree-of-freedom object). Besides, the torque applied to an object having no joint (rigid body) can be similarly inferred. In other words, the inferring device according to the embodiment can infer the torque about a controlled object having one or more joints.

Figure 2:
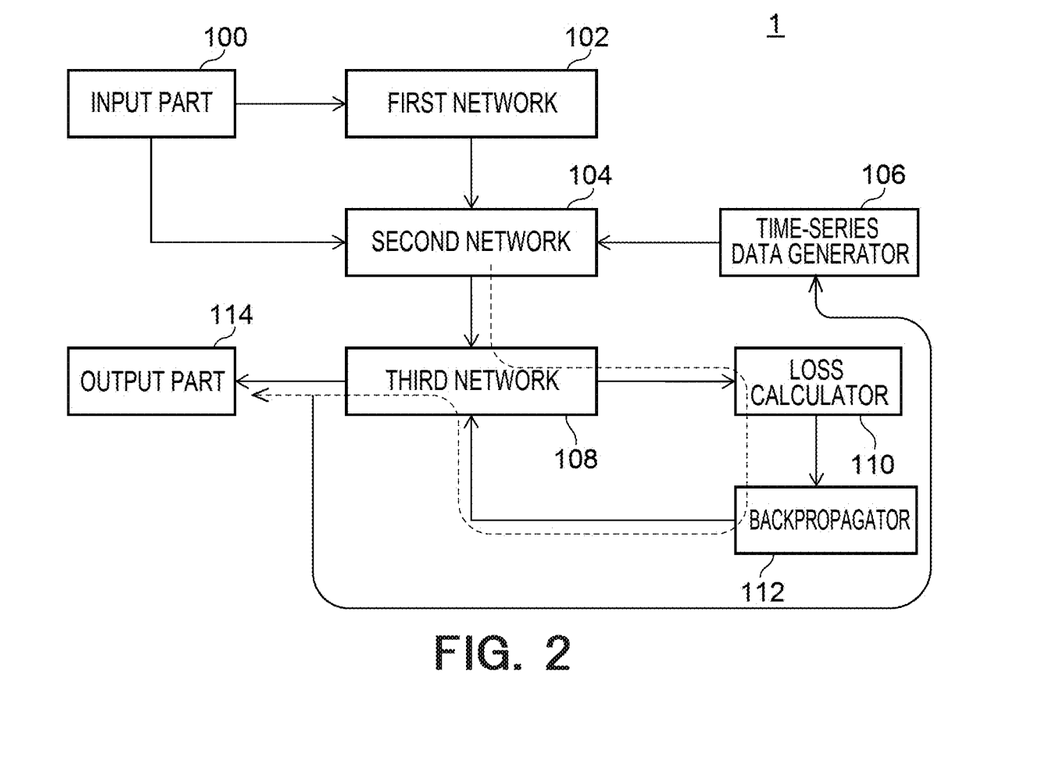
FIG. 2 is a block diagram illustrating the function of an inferring device according to the embodiment.

FIG. 2 is a block diagram illustrating the function of an inferring device 1 which infers torque to be applied to an object to make the object into a target shape. The inferring device 1 includes an input part 100, a first network 102, a second network 104, a time-series data generator 106, a third network 108, a loss calculator 110, a backpropagator 112, and an output part 114.

The input part 100 accepts input of data showing the current state of the object. The object is an object having one or more degrees of freedom (joints), and the data showing the state of the object made by connection by the joints is input. As the data showing the state of the object, for example, image data obtained by imaging the object is input into the input part 100. Together with the image data, data about an optical flow indicating speed information on the object may be further input. In the following explanation, the image of the object and the optical flow are input as the data showing the state of the object. Further, in the case of the multidegree-of-freedom object, a value indicating the connection state of the joints, more specifically, how a ramus between the joints is connected by the joints may be input. The connection state of the joints is, for example, a joint state.

The first network 102 is a network which, upon input of the data showing the state of the multidegree-of-freedom object, outputs data showing the feature of the input data, and is a network optimized by training through machine learning. The first network 102 is a network formed such that the dimension of an output layer is lower than the dimension of an input layer and suitable for extracting the aggregated feature amount of the input data, and is formed including a convolution layer of CNN (Convolutional neural network). In this case, the first network 102 is a so-called encoder. The network included in the first network 102 is not limited to the one realized by CNN, but may be formed of another network such as MLP (Multilayer perceptron).

The second network 104 is a network which, upon input of the feature amount output from the first network 102 and time-series information in a predetermined time period for controlling the object, outputs data made by mixing these pieces of data, and is a network optimized by training through machine learning. For example, the second network 104 is formed of an intermediate layer located between the encoder and a decoder. The second network 104 receives, for example, input of torque to be applied to each joint and the joint state indicating the connection state between the joints as the time-series information for controlling the object, and outputs data made by mixing the output from the first network 102 and these pieces of data.

The time-series data generator 106 generates a control information candidate being time-series data for controlling the object input into the second network 104. For example, in an initial state, the time-series data is initialized by a random number or a predetermined value. In the case where the inferring device 1 has already started inference, the time-series data is generated based on a value inferred one unit time period ago. The generated data is input into the second network 104 and mixed with the data output from the first network 102, and the mixed data is input into the third network 108.

Upon input of the data output from the second network 104, the third network 108 outputs data showing an inferred state of the object after a predetermined time period. More specifically, the third network 108 infers what the future state of the object will become in the case of performing a control based on the control information candidate. In the embodiment, control information for actually controlling the object is selected based on the control information candidate. The data showing the state of the object mentioned here is, for example, an image showing what position and shape the object takes. In the following explanation, the control information candidate is sometimes described simply as control information, time-series data, or the like.

The loss calculator 110 calculates a loss based on the data showing the state of the object output from the third network 108 and on the data on the target. This loss may be found, for example, by a method used in general machine learning.

The backpropagator 112 backpropagates the loss calculated by the loss calculator 110 to the third network 108 to calculate what data input into the third network 108 decreases the loss, namely, what input brings the object into a state closer to the target. The backpropagator 112 finds a gradient by the time-series data on the calculated loss and updates the time-series data based on the gradient. The output data is input into, for example, a torque generator.

As explained above, the network including the first network 102 corresponding to the encoder, the second network 104 corresponding to the intermediate layer, and the third network 108 corresponding to the decoder forms the network according to the embodiment.

The flow of data is organized here. In FIG. 2, a path indicated by a dotted line shows the flow of data at and after the second network 104 in the inferring device 1. Hereinafter, it is assumed that the unit time period is one frame, the predetermined time period during which the time series is generated is T frames, t represents time at the present moment. Besides, it is assumed that the number of degrees of freedom, namely, the number of joints (actuators) is M. As an example, the object is assumed to move in a three-dimensional space, or a plane (two-dimension). In the case of the object moving in the three-dimensional space, for example, the dimensions of the input such as the following image or joint state may be appropriately increased or decreased. Besides, the state of the network is described as one example only, and does not limit the technical scope of this disclosure.

Into the input part 100, an image (two-dimension) of the object at time t and an optical flow (two-dimension) are input, and information on the joint state (M-dimension) at time t (frame at present time) is separately input.

The first network 102 receives input of the image and the optical flow, and outputs a feature amount map. The second network 104 connects the feature amount map, the joint state, and torque data given to the object during times t to t+T−1 generated by the time-series data generator 106, and outputs them as a new feature amount. The second network 104 may reduce the dimensions of the feature amount map output from the first network 102 via a fully connected layer in advance before the connection.

The connected data is input into the third network 108, and the third network 108 outputs an inferred image showing what state the object will become at time t+T when applying the torque indicated by the time-series data input into the second network 104 to the object. The loss calculator 110 calculates the loss by comparing the image showing the shape of the object being the target with the image output from the third network 108. The backpropagator 112 calculates the gradient of the loss with respect to the time-series data and updates the time-series data. Those kinds of processing are performed in parallel by N batches. Since the time-series data on torque differs for each batch, the data is updated as pieces of time-series data on torque different from one another.

The second network 104 receives input of the updated time-series data and outputs the mixed data, the third network 108 receives input of the mixed data, and the loss calculator 110 calculates the loss. Here, the losses for batches are compared, and the time-series data on torque in a batch with a lowest loss is output from the output part 114. The obtained time-series data is input into the time-series data generator 106, in which the time-series data at time t+1 is generated.

In other words, the time-series data with a lowest loss of the time-series data obtained in the batches is input into the time-series data generator 106. Thus, the time-series data generated based on the time-series data with a low loss at time t is input into each batch at time t+1 after the unit time period from time t. As explained above, the time-series data (time-series data at time t+1) to be input into the second network 104 is generated using the time-series data (time-series data with a low loss at time t) calculated for each batch in each unit time period.

At time t+1, the same processing is performed based on the image of the object controlled by the torque inferred at time t, the optical flow, and the time-series data generated by the time-series data generator 106 using the time-series data on torque inferred at time t.

Figure 3:
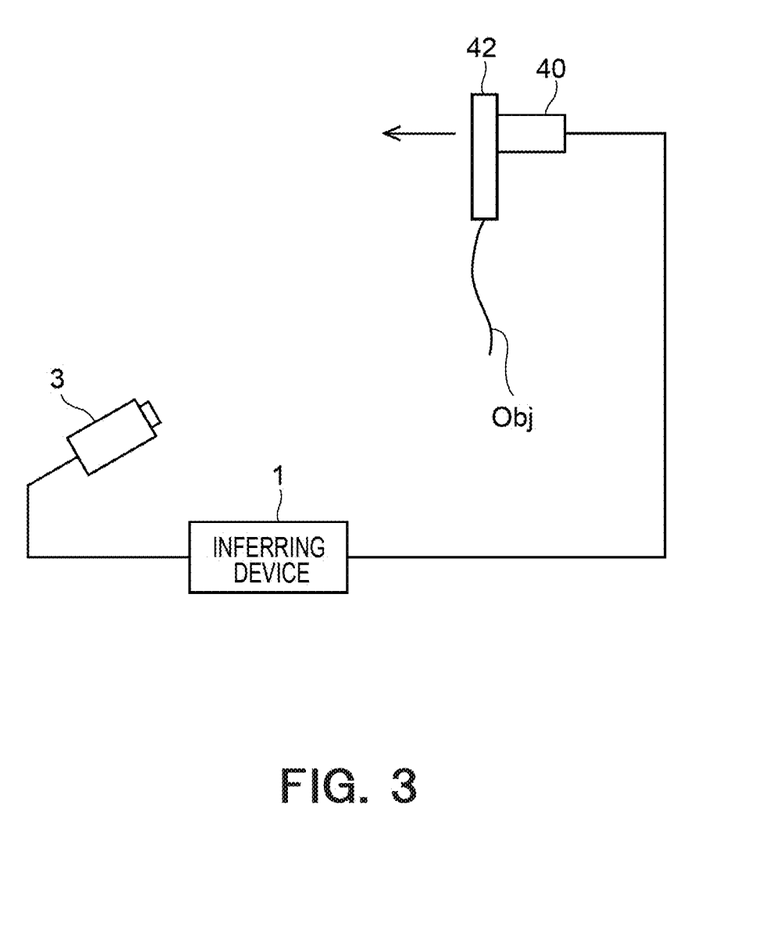
FIG. 3 is a view illustrating an installation example of the inferring device according to the embodiment.

FIG. 3 is a view illustrating an example of a state where the inferring device 1 is installed. The inferring device 1 is connected, for example, to an information acquisition device 3 such as a camera. The information acquisition device 3 acquires the state of an object Obj in a movable space. The information acquisition device 3 is, for example, an RGB camera or an RGBD camera but is not limited to those optical sensors, and only needs to be a sensor or a capture capable of suitably acquiring the state based on the characteristics of the object Obj, such as an ultrasonic sensor.

An object control device 40 is a device which receives a signal controlled by the inferring device 1 and transmitted thereto and applies force (including torque) to the object based on the signal. The object control device 40 is, for example, a motor and rotates a rotation axis so as to apply the time-series torque inferred by the inferring device 1. An arrow in the drawing indicates the rotation axis of the object control device 40. A torque applier 42 is connected to the object control device 40 and applies torque to the object Obj. As illustrated in the drawing, for example, torque is applied to one end of the object Obj to control the object. Note that the torque applier 42 is not limited to the case of being connected to the one end of the object Obj, the torque applier 42 may be, for example, the one that applies torque to the vicinity of the middle of the object Obj, or the one that applies torque or force not to one point of the object but to more points or a surface. The torque applier 42 is not always necessary, but the object control device 40 may directly apply the torque.

The inferring device 1 acquires the image showing the position information or the like on the object Obj for each frame from the information acquisition device 3, and infers in real time the signal about the torque to be applied to the object Obj from the object control device 40 for each frame. Based on the inferred signal about the torque, the object control device 40 controls the torque applier 42 so as to apply torque for controlling the object Obj. As explained above, the inferring device 1 outputs a control signal based on the current state so as to bring the object Obj into the state and shape of the target.

Here, the real time (actual time period) is used in a general sense in information science, information engineering and so on. For example, in the case where data input/output processing is executed for each one frame, the real time means a predetermined time period (a time period such as ⅓₀ seconds or ⅙₀ seconds) for the frame. Further, the real time means a time period such as 30 milliseconds having a margin corresponding to a time period of ⅓₀ seconds. These numerical values are examples only, and the real time only needs to be indicated as a time period corresponding to at least one of the computer and its peripheral devices. Further, the real time may be later by the predetermined time period and, in this case, may mean a time period ready for next control or a time period having a delay not largely different from braking predicted in the next control. For example, the real time may mean that the processing in the current frame is in a state capable of executing the control in the current frame or after one to three frames or the like.

Assuming that the posture of the object is $\theta$, an equation of motion of the object can be expressed as $M(\theta)d^2\theta/dt^2 + c(\theta, d\theta/dt) + g(\theta) = \tau$. Here, $d\theta/dt$ represents a speed of the object, $d^2\theta/dt^2$ represents an acceleration of the object, T represents joint torque, M represents an inertia matrix, c represents a centrifugal force, Coriolis force, viscous friction or the like, and G represents gravity load torque. In the embodiment, the network is to approximately find a solution of the equation of motion.

Figure 4:
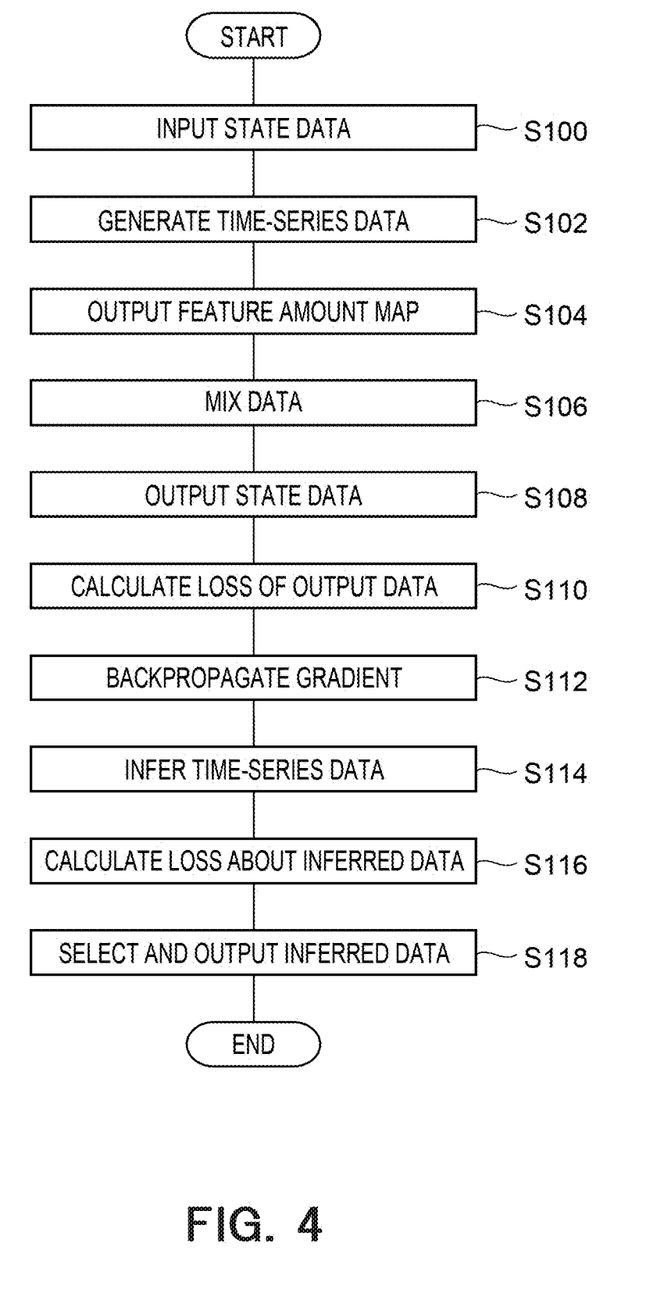
FIG. 4 is a flowchart illustrating the flow of processing by the inferring device according to the embodiment.

FIG. 4 is a flowchart illustrating the flow of inferring processing by the inferring device 1. The above-explained processing is explained in detail for each step using FIG. 4. This flowchart illustrates, especially, the processing in one frame, and the time-series data in the next frame is generated based on the time-series data inferred in the current frame as explained above.

The following processing is executed in each of the N batches unless otherwise mentioned. To the batches, for example, IDs by integral values such as 0, 1, ... n, ..., N, respectively. Besides, it is assumed that the minimum value and the maximum value of torque which can be applied to the object are $\tau_{min}$ and $\tau_{max}$, respectively. For example, in the case where the motor can apply the same level of clockwise torque and counterclockwise torque, torque can be expressed as $\tau_{min} = -\tau_{max}$ with a state of applying no torque regarded as 0. The expressions of "or less" and "or more" in the explanation can be expressed in different words such as "smaller" and "larger" as needed, and vice versa.

First, state data is input into the inferring device 1 via the input part 100 (S100). The state data is, for example, the image obtained by imaging the current state of the multi-degree-of-freedom object having multiple joints by the camera or the like and data on the optical flow calculated from the image and an image in the previous frame. In the case where the motion of the object is two-dimensional, the data imaged by the normal camera is input. Further, the joint state indicating the connection state of the joints is also input.

Not limited to the above, for example, in the case of the object capable of freely moving in the three-dimensional space, a depth map may be acquired using the RGBD camera and the depth map may be input. Besides, the input image may be an image of three channels shown in RGB, four channels shown in RGBD, an image of one channel made into gray scale from the RGB data, or an image of one channel or two channels made by adding also the influence of the depth map from the RGB data. Further, the input image may be an image made by binarizing the images. Further, these images may be the ones subjected to appropriate crop processing and resize processing in advance. In the input part 100, these kinds of processing may be appropriately performed. In the following, the input image is explained as having been binarized, which does not limit this disclosure.

Next, the time-series data generator 106 generates torque time-series information $\tau^{ts} = \{\tau^{ts}_t, \tau^{ts}_{t+1}, \tau^{ts}_{t+T-1}\}$ (S102). In the initial state, for example, when $R_i$ is set as a random value of $[\tau_{min}, \tau_{max}]$, $\tau^{ts} = \{R_o, \ldots, R_{T-1}\} = \text{Random}(N)$. As another example, a time series composed of a steady value establishing $\tau^{ts} = \{c_n, \ldots, c_n\} = \text{Constant}(N)$ is generated with a predetermined value of $c_n = [(N-1-n)\tau_{min} + n\,T_{max}]/(N-1)$.

In the case where the torque time-series information has been already obtained in the previous frame, for example, the current time is set to t, and in the case where the obtained time-series information is information at t', the obtained time-series information $\{\tau_{t'}, \tau_{t'+1}, \tau_{t'+T-1}\}$ is shifted to generate time-series information as $\tau^{ts} = \{\tau_{t'+1}, \tau_{t'+2}, \ldots, \tau_{t'+T-1}, \tau_{t'+T}\}$. Further, a random value may be added to the shifted value in order to give more flexibility. For example, the time series made by adding a random noise $r_i$ of $[(\tau_{min} + \tau_{max})/2 + \alpha\,\tau_{min}]$ to the above shifted value with $\alpha$ as a constant may be the torque time series, namely, $\tau^{ts} = \{\tau_{t'+1} + r_o, \tau_{t'+2} + r_1, \ldots, \tau_{t'+T-1} + r_{t-2}, \tau_{t'+T-1} + r_{t-1},\} = \text{Shift}(N, \alpha)$. For example, $\alpha = 0.25$ but not limited to this.

As another example, the time series may be the one made by mixing Constant and Shift obtained in the above. In other words, the time series may be $\tau^{ts} = \text{Constant}(N_{constant}) + \text{Shift}(N - N_{constant}, \alpha) = \text{Mixed}(N, N_{constant}, \alpha)$ with $N_{constant}$ as a predetermined value. In this case, when each component of $\tau^{ts}$ is not within a range of $[\tau_{min}, \tau_{max}]$, the clipping processing may be performed.

Next, the image and the optical flow input at S100 are input into the first network 102 to acquire the feature amount map indicating the state of the object at current time t (S104). Note that the step at S102 may be executed before S100 or after S104. The generation timing does not matter as long as the generation is executed before S106 and the time-series data can be appropriately input into the second network 104.

Next, the feature amount map output at S104, the joint state input at S100, and the time-series data generated at S102 are input into the second network 104 to acquire data made by mixing the time-series data and the feature amount map (S106). As an example, the second network 104 first receives input of the feature amount map output from the first network 102, and converts the feature amount map by full connection. A layer accepting input of the fully connected data, the time-series data, and the joint state is provided in the second network 104, and these pieces of data are input into this layer, whereby the mixed data is output from the output layer.

Next, the mixed data output at S106 is input into the third network 108 to output the image showing the predicted state of the object after T frames (time t+T) (S108). As the series of flow, the first network 102 may function as the encoder which converts the input data into the feature amount map, the second network 104 may function as the intermediate layer which applies processing to the feature amount map, and the third network 108 may function as the decoder which decodes the data processed in the intermediate layer.

Next, the acquired predicted image and the target image are input into the loss calculator 110, and the loss of the predicted image is calculated (S110). As an example, a loss Loss is expressed as follows with the target image showing a desired state of the object as $S_t$, the predicted image showing the predicted state of the object as $S_p$, and $\beta$ as the predetermined value: $S'_t=1.0-\tan h(\beta \times DT(1-S_t))$, Loss=$MSE(S_p-S'_t)$, where tan h is a hyperbolic tangent, MSE is a mean square error, and DT is distance transformation. For example, $\beta=0.5$ but not limited to this.

The tan h can also be converted by a function used as another activation function such as a sigmoid function or a ReLU function. In this case, the numerical value concretely indicated in the above equation may be changed based on the function in use.

A distance transformation image is an image showing the distance to a nearest pixel other than the object with respect to each pixel value, and is given on the basis of, for example, the distance of one pixel (pitch between adjacent pixels) as a unit distance. More specifically, the distance transformation image is an image in which 0 as a value of a pixel where the object does not exist indicates the distance from a pixel where the object exists to the nearest pixel having a value of 0, as a value of the pixel where the object exists.

A smaller $\beta$ functions not to allow the image less similar to the target image, whereas a larger $\beta$ functions to allow even the image not similar to the target image. For example, when $\beta$ is 0, the mean square error for each pixel between the target image itself and the inferred image will be taken. By setting $\beta$ as above, the image is blurred, the sensitivity for positional deviation is suppressed, and the result of inference is made not too sharp.

Next, the backpropagator 112 calculates the gradient of the loss Loss calculated by the loss calculator 110 with respect to $\tau^{ts}$ and backpropagates it through the third network 108 (S112). The gradient can be found as $g=dLoss/d\tau^{ts}$.

Next, the backpropagator 112 infers the time-series data based on the found gradient g (S114). The inferred time-series data $\tau^{ts}_{opt}$ can be calculated as $\tau^{ts}_{opt}=\tau^{ts}-\gamma g/|g|$. $\gamma$ is a predetermined value indicating the coefficient of optimization. For example, $\gamma=0.125 (\tau_{max}-\tau_{max})$ but not limited to this.

Next, the time-series data $\tau^{ts}_{opt}$ inferred through backpropagation by the backpropagator 112 is input again into the second network and the third network, and a loss about the inferred data is calculated (S116). As the calculation method of the loss, the same equation as that in S110 is used.

Next, the output part 114 outputs $\tau^{ts}_{opt}$ as the inference result when the found loss about the inferred time-series data $\tau^{ts}_{opt}$ is smaller than the loss about the generated time-series data $\tau^{ts}$, and outputs $\tau^{ts}$ as the inference result otherwise (S118).

In the case of using a plurality of batches here, the processing at and after S112 may be applied only to the time-series data generated in a batch having the lowest loss found at S110. In other words, after the processing at S110 in each batch, the result of the batch having the lowest loss is extracted, and the processing at S112 to S118 may be performed based on the generated $\tau^{ts}$ of the batch.

As another example, the processing up to S116 is performed in each batch, and then the result having the lowest loss in the generated time-series data and the inferred time-series data in each batch may be extracted, and the output part 114 may output it.

The information on torque output from the output part 114 is transmitted to the object control device 40, whereby the control of the object Obj is performed.

As explained above, according to the embodiment, it becomes possible to dynamically control the object, especially, the object having multiple degrees of freedom, namely, multiple joints, so that the object becomes the target state. The backpropagation for acquiring the time-series data is not performed on the first network 102 but is performed on the third network 108 as explained above, thereby making it possible to perform inference in the actual time period also at a higher frame rate. Further, according to the embodiment, it becomes possible to perform modeling of a dynamic operation that is a task which cannot be realized without dynamic operation. Dynamically generating the operation has not been often performed because it is difficult to model the dynamic operation so as to overwhelm the static operation and it is difficult to apply the modeling through the machine learning to the actual time period-based control on the actual device. According to the embodiment, it becomes possible to apply the training also on the task which cannot be realized without the continuous and dynamic operation.

Note that that the object becomes the target state means that the object ideally becomes the state shown by the target image, more specifically, the state where the image obtained by imaging the object and the target image become the same state, and also includes that the object or the image obtained by imaging the object becomes a state acceptably similar to the target image.

Next, a training device 2 for training the inferring device 1 according to the embodiment is explained.

Figure 5:
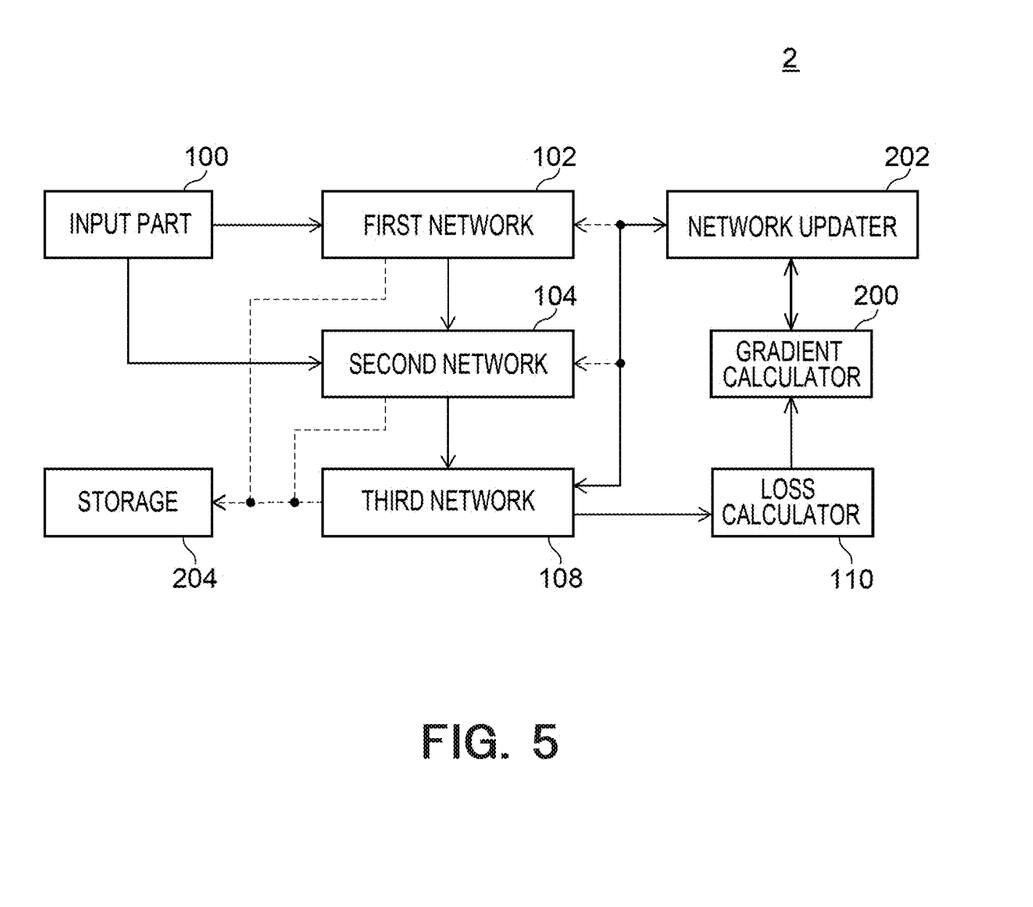
FIG. 5 is a block diagram illustrating the function of a training device according to the embodiment.

FIG. 5 is a block diagram illustrating the function of the training device 2. The training device 2 is a training device which trains, for example, parameters of the first network 102, the second network 104, and the third network 108 which are included in the inferring device 1, and further includes a gradient calculator 200, a network updater 202, and a storage 204.

The gradient calculator 200 calculates the gradient of the loss calculated by the loss calculator 110. Note that, as the loss calculator 110, the same one as that in the above inferring device 1 is illustrated but, not limited to this, a loss calculator for network training may be provided. In other words, the loss calculators in the training device 2 and the inferring device 1 may be different ones.

The network updater 202 updates the networks by performing backpropagation based on the gradient found by the gradient calculator 200. For example, the network updater 202 updates the networks by updating the network from the output layer of the third network 108 to the input layer of the third network 108 in sequence, and subsequently preferably performing backpropagation to the second network 104 and the first network 102. Unlike the inference as explained above, for the stage of training requiring low real-time property, it is preferable to update the networks by performing backpropagation not only to the third network but also to the second network or/and the first network.

Forward propagation is performed again to calculate a loss using the networks updated by the backpropagation, backpropagation is performed based on the calculated loss, and the network updater 202 updates the networks. For this training, the general machine learning method is used. At the stage where the training is finished, the parameters of the networks are stored in the storage 204. Note that the storage 204 may be included in the same hardware as that of other modules, or may be another database or the like via the networks.

Figure 6:
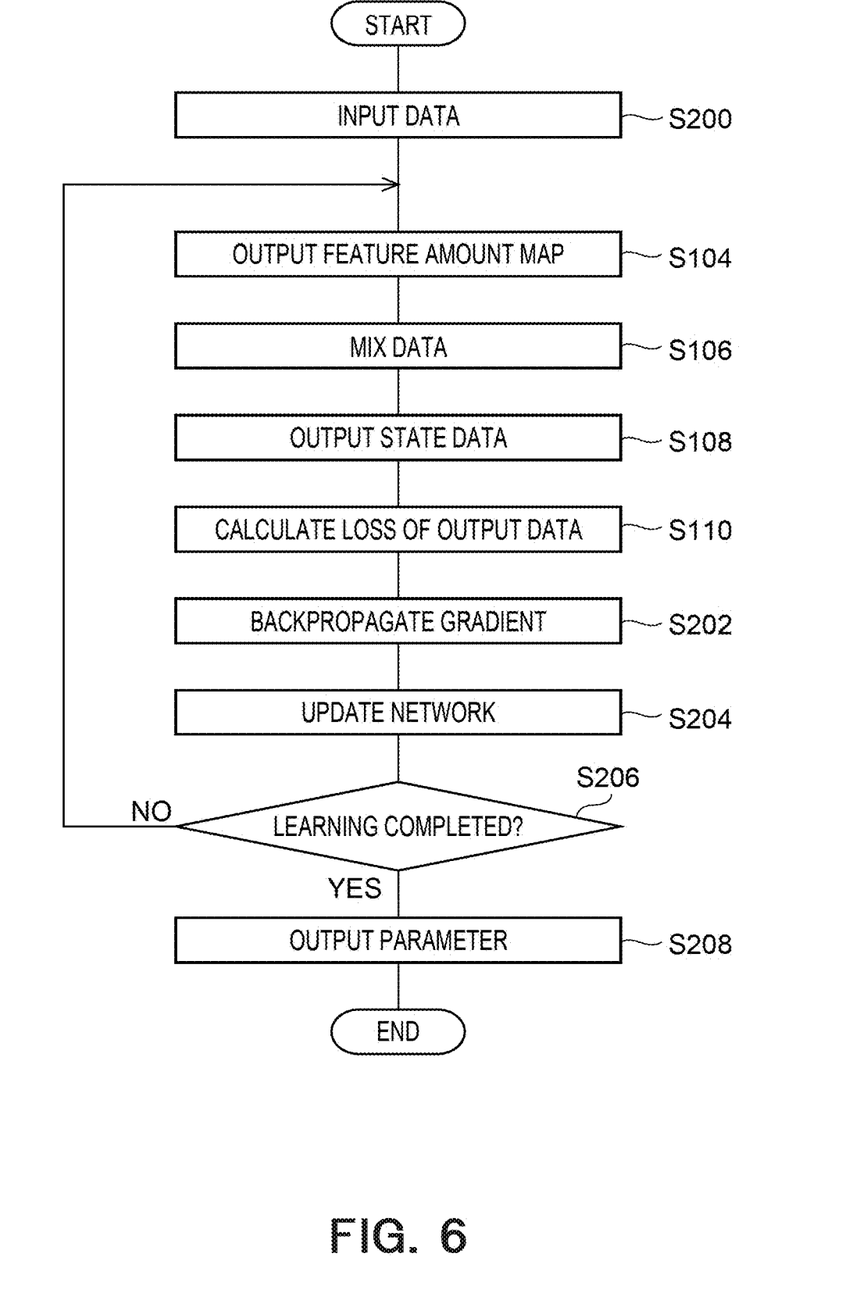
FIG. 6 is a flowchart illustrating the flow of processing by the training device according to the embodiment.

FIG. 6 is a flowchart illustrating the flow of processing by the training device 2 according to the embodiment.

First of all, training data is input into the training device 2 via the input part 100 (S200). The training data is, for example, an image showing the state of the object imaged at a certain time, time-series information in a predetermined time period on torque applied to the object from the object control device 40 at the timing when the image was acquired, a joint state indicating the connection information between joints, and an image showing the state of the object after a lapse of a predetermined time (frame) when the control was performed. The image showing the state of the object may be a moving image or a series of still images. In the case where the image showing the state of the object is the moving image, the moving image may be converted into still images after input. Besides, in order to find the optical flow at a start time, the image in a frame previous to the start time may be input or the optical flow calculated in advance may be input.

In the case where the image showing the state of the object is the moving image, the frames for the predetermined time period may be appropriately extracted in the training device 2 together with the control information for the predetermined time period from the start frame. As explained above, by associating the moving image showing the series of motions with the time-series information on the control corresponding to the moving image, it is possible to acquire the information from arbitrary time in the moving image. In the case of processing the moving image and the time-series information on the control in the training device 2, a moving image processor may be included and, in this case, the data to be input may be the one transferred from a memory of a database. The moving image processor may be located outside the training device 2 and, in this case, the image at the start time, the image after T frames, and the time-series control information for T frames from the start time may be input from the input part 100. As a matter of course, the original data does not have to be the moving image, but may be still images captured at the start time and after T frames and the time-series information from the start time.

In other words, when the control is performed for T frames, the start time and the data showing what state the object has transitioned into at the time after T frames are enough as the training data. Therefore, the data can be extracted from the moving image as explained above. By extracting the data from the moving image, it is also possible to extract an arbitrary portion from the moving image captured in a time period sufficiently longer than the predetermined time period and acquire many pieces of training data.

The image at the start time input into the input part 100 and the optical flow calculated from the start time and the image in the previous frame are transmitted to the first network 102, the joint state and the time-series data are transmitted to the second network 104, and the image showing the state after T frames is transmitted as correct solution data to the loss calculator 110.

Next, the processing at S104 to S110 is performed as in the above inferring device 1 based on the data input into the modules. However, at S106, not the generated time series but the time-series data input from the input part 100 is input, and at S110, the data being comparison object is the image in a T-th frame from the start time when it is input as the training data. As explained above, in the training device 2, what image will be generated when the control on the input time-series data is applied to the input state of the object, is predicted by the network, and the predicted state of the object and the state of the correct solution are compared to calculate the loss.

Next, the gradient calculator 200 calculates the gradient of the loss between the correct solution data and the predicted data, and backpropagates it in reverse order from the third network (S202).

Along with the execution of the backpropagation, the network updater 202 updates the parameters of the networks (S204). For the backpropagation and the update of the parameters, a general training method may be used or a training method specialized for the embodiment may be used.

Next, the network updater 202 determines whether the training has been completed for the updated network (S206). The determination of the completion may be based on the general training method. The completion condition is, for example, that the calculated loss has become smaller than a predetermined value, that the training for a predetermined number of epochs has been completed, that the evaluation of validation has become larger than a predetermined value or the like.

When it is determined that the training has been completed (S206: YES), the training is ended, and the parameters of the networks are output to the storage 204, and the processing is ended.

When it is determined that the training has not been completed (S206: NO), the processing from S104 is repeated using the updated networks.

As explained above, the training device 2 forms the network which predicts the state of the object after the control is actually performed from the input state of the object and time-series data for controlling the object, and thereby can predict what time-series control should be performed from the current state of the object in order to bring the object closer to the state of the target as in the above inferring device 1.

Next, the result using the inferring device 1 according to the embodiment is described. As an index indicating the similarity between the target state and the state controlled by the inferred torque, SCD (Symmetric Chamfer Distance) was used. SCD is expressed as $SCD(S_1, S_2)=Sum(S_1 \times DT(1-S_2)+S_2 \times DT(1-S_1))$ when comparing $S_1$ and $S_2$.

Figure 7:
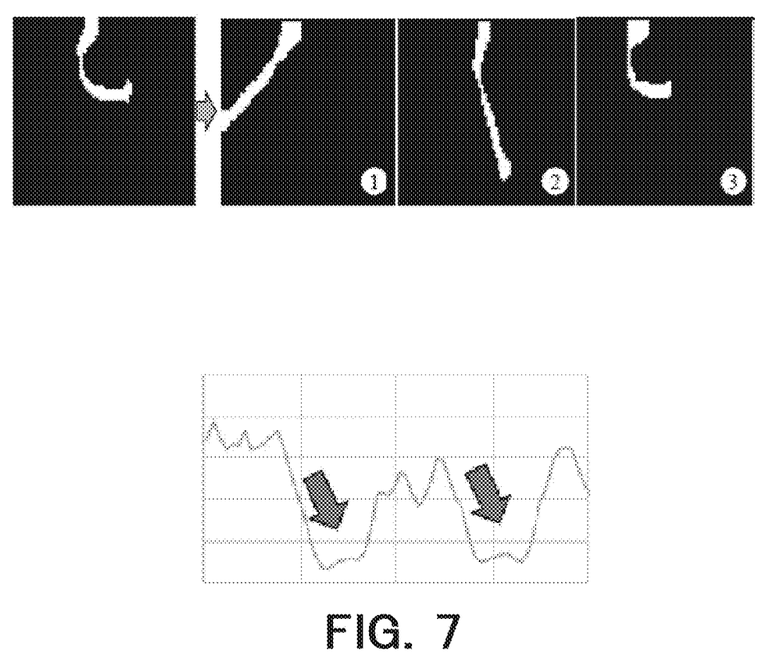
FIG. 7 is a view illustrating an experimental result by the inferring device according to the embodiment.
Figure 8:
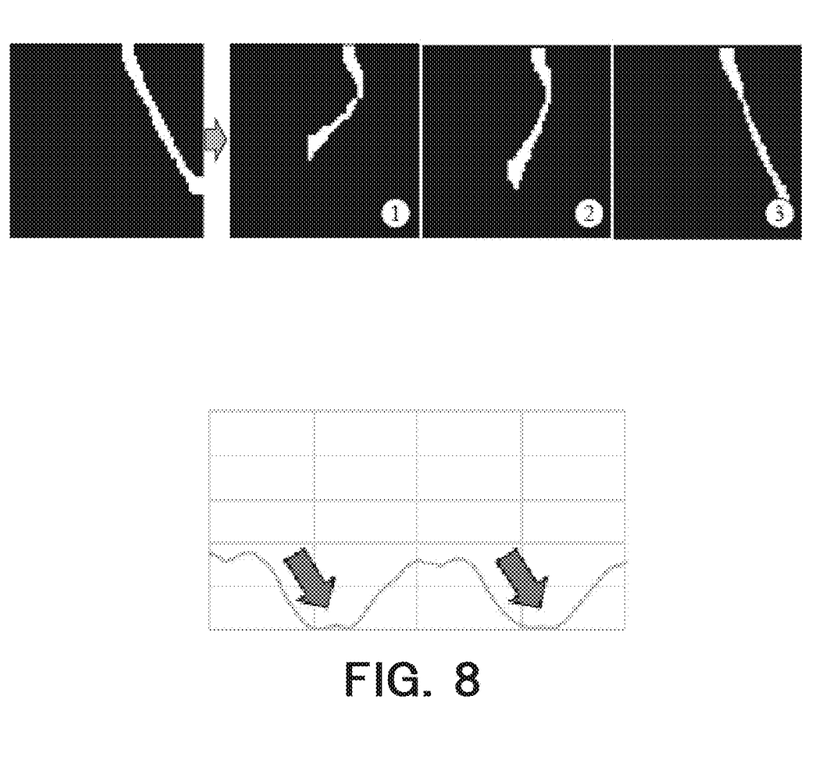
FIG. 8 is a view illustrating an experimental result by the inferring device according to the embodiment.

FIG. 7 and FIG. 8 are views illustrating the experimental results carried out in the system in FIG. 3. In each view, the leftmost on the upper tier is the target image. By controlling the torque from the state indicated in 1 of the view, the state transitions to the state in 3 via the state in 2. The state of the object in 3 is closer to the state of the target.

The view at the lower tier is a graph illustrating SCD in the case of performing the time-series control. The vertical axis represents Chamfer Distance, and the horizontal axis represents time period. A part indicated by an arrow is a time period when the state is close to the target, and a longer time period represents better inference. As can be seen in FIG. 7 and FIG. 8, the state close to the target continues long in the embodiment. The control can be made both in a state where a soft object as a target is linear as in FIG. 7 and in a state where the soft object is curved as in FIG. 8.

In the experiments, the motion in the two-dimensional space is explained, but this disclosure can be implemented also in the three-dimensional space. This enables control of, for example, a robot dynamically folding clothes or the like.

In the inferring device 1 and the training device 2 according to some embodiments, each function may be implemented by a circuit constituted by an analog circuit, a digital circuit, or an analog/digital mixed circuit. A control circuit which controls each function may be included in the optimization apparatus 1. Each circuit may be implemented as an ASIC (application specific integrated circuit), an FPGA (field programmable gate array), or the like.

In all of the foregoing explanations, at least a part of the inferring device 1 and the training device 2 may be constituted by hardware, or by software and a Central Processing Unit (CPU) or the like may implement the function through information processing of the software. When it is constituted by software, programs that enable the inferring device 1, the training device 2 and at least a part of the functions may be stored in storage media, such as a flexible disk and a CD-ROM, and may be executed by being read by a computer. The storage media are not limited to detachable media such as a magnetic disk or an optical disk, and may include fixed storage media such as a hard disk device and a memory. That is, the information processing may be concretely implemented using hardware resources. For example, the processing may be implemented on a circuit such as the FPGA, and may be executed by hardware. The processing or executing of the job may be performed by using, for example, an accelerator such as a Graphics Processing Unit (GPU).

For example, a computer may be programmed to act according to the above embodiments by dedicated software stored in a computer-readable storage medium. The kinds of storage media are not limited. The computer may be used to implement a device according to the embodiment by installing dedicated software on the computer, e.g., by downloading the software through a communication network. The information processing is thereby concretely implemented using hardware resources.

Figure 9:
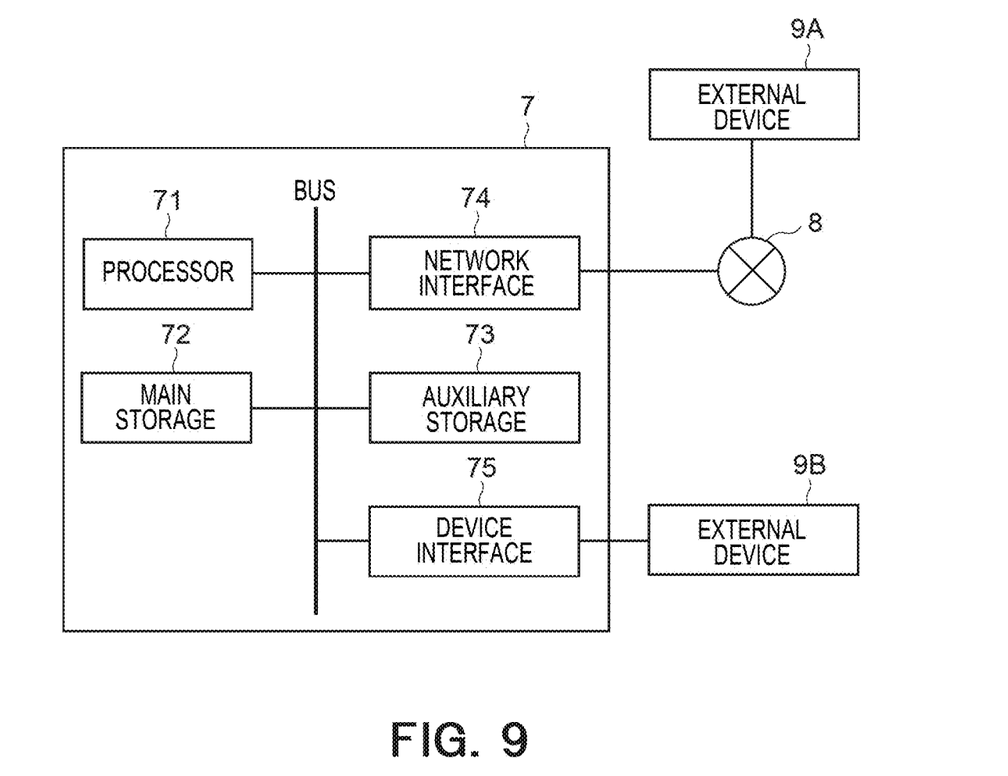
FIG. 9 is a block diagram illustrating an example of hardware implementation according to an embodiment.

FIG. 9 is a block diagram illustrating an example of a hardware configuration according to some embodiments of the present disclosure. The inferring device 1 and the training device 2 may include a computing device 7 having a processor 71, a main storage 72, an auxiliary storage 73, a network interface 74, and a device interface 75, connected through a bus 76.

Although the computing device 7 shown in FIG. 9 includes one of each component 71-76, a plurality of the same components may be included. Moreover, although one computing device 7 is illustrated in FIG. 9, the software may be installed into a plurality of computing devices, and each of the plurality of computing devices may execute a different part of the software process.

The processor 71 may be an electronic circuit (processing circuit) including a control device and an arithmetic logic unit of the computer. The processor 71 may perform arithmetic processing based on data and programs input from each device or the like of an internal configuration of the computing device 7, and output arithmetic operation results and control signals to each device or the like. For example, the processor 71 may control each component constituting the computing device 7 by executing an OS (operating system), applications, and so on, of the computing device 7. The processor 71 is not limited to a particular processor and may be implemented by any processor capable of performing the above-stated processing. The inferring device 1 and the training device 2 may be implemented by the processor 71. Here, the processing circuitry may be one or more electric circuitry arranged on one chip, or may be one or more electric circuitry arranged on two or more chips or devices.

The main storage 72 may store instructions executed by the processor 71, various data, and so on, and information stored in the main storage 72 may be directly read by the processor 71. The auxiliary storage 73 may be a storage other than the main storage 72. These storages may be implemented using arbitrary electronic components capable of storing electronic information, and each may be a memory or a storage. Both a volatile memory and a non-volatile memory can be used as the memory. The memory storing various data in the inferring device 1 and the training device 2 may be formed by the main storage 72 or the auxiliary storage 73. For example, at least one of the storages 204 for the inferring device 1 and the training device 2 may be implemented in the main storage 72 or the auxiliary storage 73. As another example, at least a part of the storage 204 may be implemented by a memory which is provided at the accelerator, when an accelerator is used.

The network interface 74 may be an interface to connect to a communication network 8 through a wire or wireless interface. An interface which is compatible with an existing communication protocol may be used as the network interface 74. The network interface 74 may exchange information with an external device 9A which is in communication with computing device 7 through the communication network 8.

The external device 9A may include, for example, a camera, a motion capture device, an output destination device, an external sensor, an input source device, and so on. The external device 9A may be a device implementing a part of the functionality of the components of the inferring device 1 and the training device 2. The computing device 7 may transmit or receive a part of processing results of the inferring device 1 and the training device 2 through the communication network 8, like a cloud service.

The device interface 75 may be an interface such as a USB (universal serial bus) which directly connects with an external device 9B. The external device 9B may be an external storage medium or a storage device. At least part of the storage may be formed by the external device 9B.

The external device 9B may include an output device. The output device may be, for example, a display device to display images, and/or an audio output device to output sounds, or the like. For example, there external device may include an LCD, (liquid crystal display), a CRT (cathode ray tube), a PDP (plasma display panel), a speaker, and so on. However, the output device is not limited to these examples.

The external device 9B may include an input device. The input device may include devices such as a keyboard, a mouse, a touch panel, or the like, and may supply information input through these devices to the computing device 7. Signals from the input device may be output to the processor 71.

The invention claimed is:

1. An inferring device comprising:
one or more memories; and
one or more processors configured to:
input at least data about a state of a controlled object and time-series control information for controlling the controlled object, into a trained network that has been trained by machine learning;
acquire predicted data about a future state of the controlled object controlled based on the time-series control information, via the trained network into which the data about the state of the controlled object and the time-series control information have been input; and
output, through a backpropagation on at least a part of the trained network based on at least the predicted data about the future state of the controlled object acquired from the trained network, new time-series control information for controlling the controlled object to bring the future state of the controlled object into a target state, wherein:
the trained network comprises
a second trained network configured to output data based on at least the data about the state of the controlled object and the time-series control information, and
a third trained network configured to output the predicted data based on the data output from the second trained network; and
the one or more processors are configured to
output, via the second trained network, the data based on at least the data about the state of the controlled object and the time-series control information, and
output, via the third trained network, the predicted data based on the data output via the second trained network.

2. The inferring device according to claim 1, wherein the time-series control information to be input into the trained network and the new time-series control information to be output are the same kind of information.

3. The inferring device according to claim 1, wherein the one or more processors are configured to calculate the new time-series control information based on the predicted data and the time-series control information input into the trained network.

4. The inferring device according to claim 1, wherein the one or more processors are configured to
calculate first data based on the predicted data and on the target state of the controlled object,
calculate second data to be used for updating at least part of the time-series control information input into the trained network, from the calculated first data via the at least part of the trained network, and
update the at least part of the time-series control information input into the trained network based on the calculated second data, and output the new time-series control information including the updated part.

5. The inferring device according to claim 1, wherein the time-series control information input into the trained network and the new time-series control information output based on the predicted data acquired via the trained network are time-series control information for predetermined frames for controlling the controlled object.

6. The inferring device according to claim 1, wherein the control information for at least part of the frames of the new time-series control information is control information obtained by updating control information for part of the frames of the time-series control information input into the trained network based on the predicted data.

7. The inferring device according to claim 1, wherein the one or more processors are configured to output the new time-series control information to a control device for controlling the controlled object.

8. The inferring device according to claim 1, further comprising
the trained network trained by machine learning.

9. The inferring device according to claim 1, wherein the time-series control information is generated based on the new time-series control information output a unit time period ago.

10. The inferring device according to claim 1, wherein the one or more processors are configured to execute backpropagation based on the predicted data for the third trained network, and output the time-series control information to bring the state of the controlled object into the target state.

11. The inferring device according to claim 1, wherein the one or more processors are configured to
calculate a loss between the output data from the third trained network and the target state, and
output the new time-series control information via at least the third trained network based on a gradient of the loss.

12. The inferring device according to claim 1, wherein:
the trained network comprises
a first trained network configured to extract a feature amount of the controlled object from the state of the controlled object,
the second trained network being a trained network configured to output data based on the feature amount of the controlled object and on the time-series control information; and
the one or more processors are configured to
extract the feature amount of the controlled object from the state of the controlled object via the first trained network, and
output, as the data based on at least the data about the state of the controlled object and the time-series control information, data based on the feature amount of the controlled object and the time-series control information via the second trained network.

13. The inferring device according to claim 1, wherein:
the second trained network is a trained network configured to output data obtained by mixing the data about the information on the controlled object, and the time-series control information given for controlling the state of the controlled object within a predetermined time period from the state of the controlled object; and
the third trained network is a trained network configured to output the data about the state of the controlled object when controlled by the time-series control information within the predetermined time period.

14. The inferring device according to claim 1, wherein:
the second trained network is a trained network configured to output data obtained by mixing the data about the information on the controlled object, and the time-series control information given for controlling the state of the controlled object within a predetermined time period from the state of the controlled object and generated based on the new time-series control information output a unit time period ago; and the third trained network is a trained network configured to output the data about the state of the controlled object when controlled by the time-series control information within the predetermined time period.

15. The inferring device according to claim 1, wherein the one or more processors are configured to
perform, for each of a plurality of pieces of the time-series control information, the inputting and acquiring,
select a piece of the time-series control information from the plurality of pieces of the time-series control information, based on each predicted data about the future state of the controlled object acquired by the performing,
execute backpropagation for the selected time-series control information, and
update the selected time-series control information based on data acquired via the backpropagation.

16. The inferring device according to claim 1, wherein the data showing the state of the controlled object is image information on the controlled object and speed information on the controlled object.

17. The inferring device according to claim 1, wherein the second trained network outputs the time-series control information mixed with a feature amount of the controlled object.

18. The inferring device according to claim 1, wherein the one or more processors are configured to output the new time-series control information for controlling the state of the controlled object in real time.

19. The inferring device according to claim 1, wherein the outputting of the new time-series control information includes:
acquiring, through the backpropagation on at least the part of the trained network based on at least (i) the predicted data of the controlled object acquired from the trained network and (ii) a target data of the predicted data, one or more gradients for updating at least a part of the time-series control information having been input into the trained network; and
updating at least the part of the time-series control information based on at least the one or more gradients acquired through the backpropagation, to obtain the new time-series control information.

20. The inferring device according to claim 1, wherein the backpropagation of the outputting of the new time-series control information does not update parameters of the trained network.

21. The inferring device according to claim 1, wherein the trained network is fully trained.

22. The inferring device according to claim 1, wherein the outputting the new time-series control information is performed without updating parameters of the trained network.

23. The inferring device according to claim 1, wherein the second trained network corresponds an intermediate layer.

24. An inferring method comprising:
inputting at least data about a state of a controlled object and time-series control information for controlling the controlled object, into a trained network that has been trained by machine learning;
acquiring predicted data about a future state of the controlled object controlled based on the time-series control information, via the trained network; and
outputting, through a backpropagation on at least a part of the trained network based on at least the predicted data about the future state of the controlled object acquired from the trained network, new time-series control information for controlling the controlled object to bring the future state of the controlled object into a target state,
wherein the trained network comprises
a second trained network configured to output data based on at least the data about the future state of the controlled object and the time-series control information, and
a third trained network configured to output the predicted data based on the data output from the second trained network; and
the one or more processors are configured to
output, via the second trained network, the data based on at least the data about the future state of the controlled object and the time-series control information, and
output, via the third trained network, the predicted data from the data based on the data output via the second trained network.

25. The inferring method according to claim 24, wherein the second trained network corresponds to an intermediate layer.

26. An inferring system comprising:
one or more memories storing a trained network for outputting, based on inputting at least a current state of a controlled object and control information for controlling the controlled object into the trained network, data indicating a predicted future state of the controlled object; and
one or more processors configured to perform a backpropagation of at least a part of the trained network based on the output data output from the trained network, and output a new control information for the controlled object based on the control information inputted into the trained network and data acquired by the backpropagation,
wherein the trained network comprises
a second trained network configured to output data based on at least the data about the state of the controlled object and the control information for controlling the controlled object, and
a third trained network configured to output the data indicating the predicted future state of the controlled object based on the output from the second trained network; and
the one or more processors are configured to
output, via the second trained network, the data, and
output, via the third trained network, the data indicating the predicted future state of the controlled object.

27. The inferring system according to claim 26, wherein the second trained network corresponds to an intermediate layer.

* * * * *